May 4, 1954   C. R. MORGAN ET AL   2,677,296
UNIVERSAL TOOL ADJUSTING HOLDER
Filed March 2, 1951
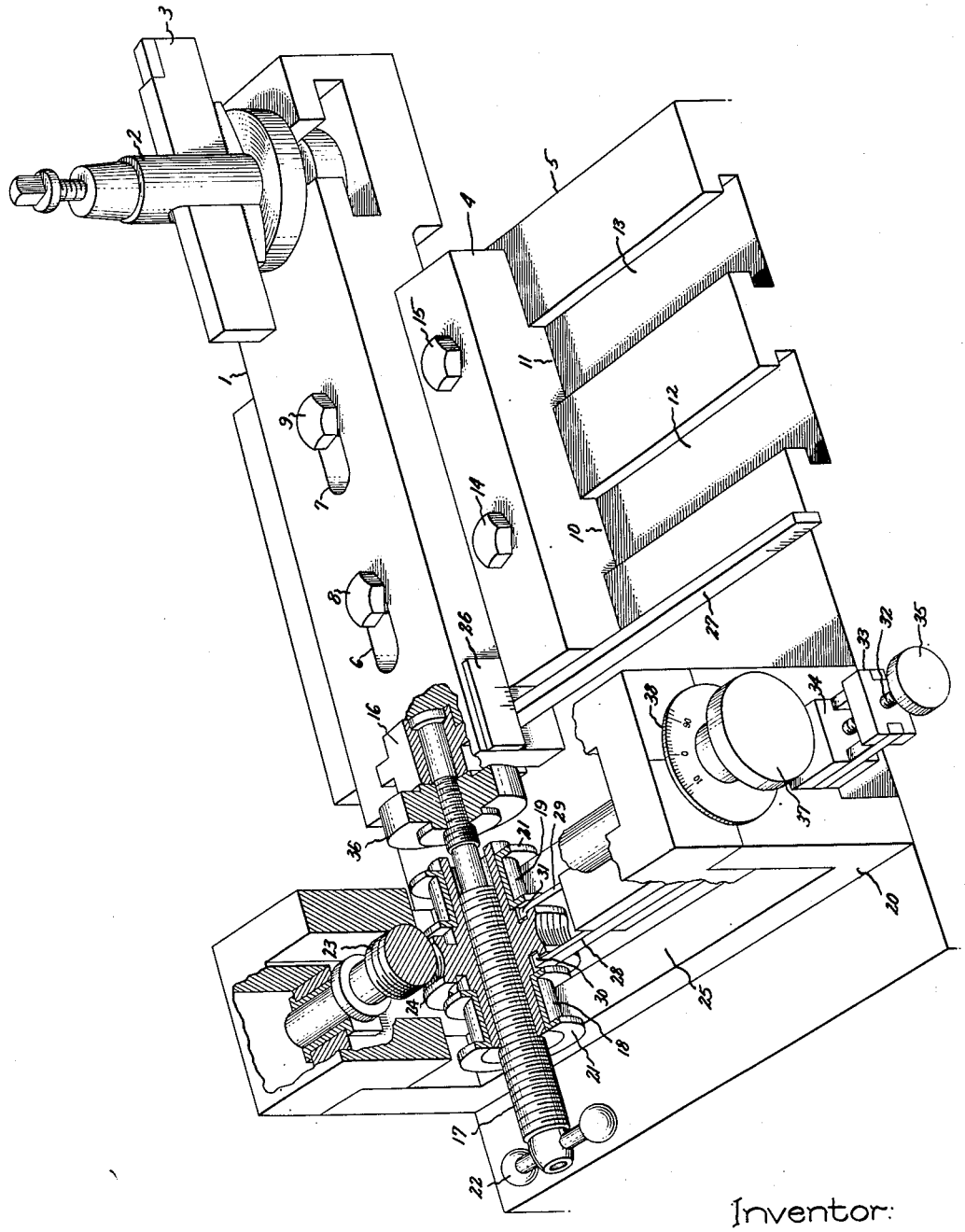
Inventor:
Claude R. Morgan,
Ernest F. Miner;
by Ernest C. Britton
His Attorney.

Patented May 4, 1954

2,677,296

UNITED STATES PATENT OFFICE 2,677,296

UNIVERSAL TOOL ADJUSTING HOLDER

Claude R. Morgan and Ernest F. Miner, Pittsfield, Mass., assignors to General Electric Company, a corporation of New York Application March 2, 1951, Serial No. 213,526

5 Claims. (Cl. 82—21)

This invention relates to machine tools, and more particularly to a universally adjustable tool holder for use with machine tools.

In the operation of machine tools, such as metal cutting lathes, one of the most laborious and time consuming operations is that of positioning the cutting tool properly with respect to the object which is being machined.

The development in recent years of high-speed materials for cutting tools, such as cemented tungsten carbide, has greatly speeded up the operation of metal working lathes, and has considerably reduced the time of the machining cycle. Thus, for example, in the case of lathes of the automatic screw machine type, where it was formerly possible for one operator to service three automatic screw machines, the use of the new high-speed cutting tools has so greatly reduced the machining cycle time with consequent increased rate of stock feeding, higher level of chip removal, and more tool set-ups for a given time interval, that the services of one operator for each automatic screw machine is now required.

In order to take full advantage of the potential saving of the use of high-speed cutting tools, such as cemented tungsten carbide tools, it is necessary that the operator's service time on the machines be reduced in the same ratio as the time of the machining cycle has been reduced by the advent of the high-speed materials for cutting tools. An important factor in reducing the operator's time required is to provide a more accurate, faster, and synchronized method of setting and adjusting the cutting tools.

Accordingly, it is an object of this invention to provide a new and improved tool holding device for use with machine tools, which may be rapidly and accurately positioned with respect to the object which is being machined.

It is a further object of this invention to provide a new and improved tool holding device for machine tools which may be easily and speedily aligned both axially and radially of the object which is being machined.

In accomplishment of these objectives, this invention provides a tool holder for machine tools in which the same set of gears with the same indexing device is used to provide both radial and axial adjustment of the tool holder with respect to the piece which is being machined.

The features of this invention which we believe to be novel are set forth with particularity in the appended claims. Our invention itself, however, both as to its organization and use, together with further objects and advantages thereof, may best be understood by reference to the following description taken in connection with the accompanying drawing which shows a perspective view of the adjustable tool holder in accordance with our invention.

Referring now to the drawing, there is shown a tool holder 1 on which is positioned a vertical tool post 2 which holds cutting tool 3. Tool holder 1 rests upon a slide block 4 and is slidably positioned relative thereto due to the provision of slots 6 and 7 in tool holder 1 which permit adjustment of tool holder 1 relative to bolts 8 and 9 which pass through tool holder 1 and slide block 4. Slide block 4, in turn, is slidably positioned on slide member 5 due to projections 10 and 11 on the lower surface of slide block 4 which engage tracks 12 and 13 on the upper surface of slide member 5. Motion of slide block 4 along tracks 12 and 13 moves the tool 3 axially with respect to the piece which is being machined, while motion of tool holder 1 relative to slide block 4 permits radial adjustment of the position of the tool 3 with respect to the piece which is being machined. When tool holder 1 has been moved to the desired position with respect to slide block 4, as will be hereinafter described, bolts 8 and 9 which pass through tool holder 1 and engage the surface of slide block 4, may be used to tighten tool holder 1 in position with respect to slide block 4. Similarly, bolts 14 and 15 may be used to tighten slide block 4 with respect to slide member 5 when slide block 4 has been moved to the desired position along tracks 12 and 13.

In order to obtain translational movement of tool holder 1 in both a radial and an axial direction, we provide a threaded shaft 17, a worm 23, and a worm wheel 24 which cooperate together in a manner to be hereinafter described.

The end of tool holder 1 opposite the end at which tool 3 is mounted is provided with a thrust bearing 16 which supports one end of threaded shaft 17. Threaded shaft 17 extends in a direction perpendicular to tracks 12 and 13.

Worm 23 is positioned perpendicularly to threaded shaft 17, and is supported in bearings at opposite ends of support structure 20. Worm wheel 24 has its internal surface threadedly engaged with threaded shaft 17 and is so positioned axially of threaded shaft 17 that its outer teeth are in mating engagement with worm 23. The worm wheel 24 is supported by bearings 18 and 19 which rest upon support structure 20. Each of the bearings 18 and 19 is provided with a flanged collar 21. Threaded shaft 17 is provided with a handle 22 at its outer end which may be used for turning threaded shaft 17 to move tool holder 1 relative to slide block 4, as will be hereinafter described.

The support structure 20 is essentially a hollow, box-like structure which serves as a support for threaded shaft 17, worm 23 and worm wheel 24. Support structure 20 is positioned on slide 5 at an end opposite to tracks 12 and 13, and with its longitudinal dimension parallel to tracks 12 and 13. The ends of the support structure 20 house the bearings for worm 23. Each of the sides of support structure 20 parallel to tracks 12 and 13 is provided with a slot having a height substantially equal to the diameter of bearings 18 and 19. Each of the slots extends for the greater part of the length of the sides of structure 20. The upper and lower edges 25 of each of the respective slots provide a track along which the flanged bearings 18 and 19 may slide or roll when slide block 4 moves along tracks 12 and 13, as will be hereinafter described in more detail.

A scale 26 is attached to an edge of tool holder 1 parallel to the direction of motion of tool holder 1 relative to slide block 4 to permit measurement of the radial or lateral position of the tool 3. Similarly, a scale 27 is attached to tool holder 1 parallel to tracks 12 and 13 to permit measurement of the axial position of tool 3.

We have also provided, for a purpose to be hereinafter described, a device for locking worm wheel 24 against rotation when desired comprising a pair of arms 28 and 29 and a block 34 which act together to clamp worm wheel 24 against rotation. The arms 28 and 29 extend lengthwise interiorly of structure 20, and each has a right angle lug member 30 and 31, respectively, at its innermost end. The outermost ends of arms 28 and 29 are rigidly attached to a block 33. Lug members 30 and 31 are engageable with the inner surface of worm wheel 24 and, if pulled up tight against the inner surface of worm wheel 24, will cooperate with block 34 to prevent worm wheel 24 from turning. The arms 28 and 29 are in sliding engagement with block 34 which is itself in sliding engagement with respect to support structure 20. An adjusting screw 32 is in threaded engagement with block 33, and by turning knob 35 at the end of adjusting screw 32, block 34 can be moved into engagement with the outer surface of worm wheel 24, thereby clamping worm wheel 24 between projecting lug members 30 and 31 on the interior surface of the worm wheel 24, and block 34 on the outer surface of worm wheel 24.

In order to further insure against the rotation of worm wheel 24, we have provided a lock nut 36 on threaded shaft 17 intermediate thrust bearing 16 and bearing 19. Lock nut 36 is in threaded engagement with threaded shaft 17, and by turning lock nut 36 until it is in abutting relation with the end of the worm wheel 24 adjacent the bearing 19, a binding action is obtained which resists rotation of worm wheel 24.

Having described the component parts of our tool holding mechanism, we will now describe its operation. When it is desired to move tool 3 in an axial direction with respect to the piece which is being machined, slide block 4 is moved along tracks 12 and 13 of tool slide 5. Since tool holder 1 is positioned in superposed relation to slide block 4, any motion transmitted to slide block 4 is also communicated to tool holder 1. In order to move slide block 4, bolts 14 and 15 are loosened.

A rough adjustment is at first obtained by pushing slide block 4 along the tracks 12 and 13 until approximately the desired position is obtained. This position may be checked by reading the scale 27 which is attached to tool holder 1 parallel to the tracks 12 and 13. During this rough adjustment, worm wheel 24 is free to rotate and move along the threads of worm 23.

After the rough adjustment in an axial direction is obtained, as just described, a fine adjustment may then be obtained by turning knob 37, attached to the end of worm 23, as will now be described. As a preliminary step to obtaining a fine axial adjustment, however, it is first necessary to lock worm wheel 24 against rotation. This is done by rotating knob 35 to move arms 28 and 29 and block 34 into clamping relation with respect to worm wheel 24 and also by tightening nut 36 up against the hub of worm wheel 24 so that it will be in frictional engagement therewith. In order to obtain a fine adjustment in the axial direction, knob 37 attached to the end of worm 23 is turned. This causes worm wheel 24, which is locked against rotational movement, as has been described, to move like a nut along the threads of worm 23. During this motion of worm wheel 24, the worm wheel is maintained clamped against rotation due to the fact that block 34 slides relative to support structure 20 during the time that worm wheel 24 moves like a nut along worm 23. Since worm wheel 24 is mounted on threaded shaft 17 which is supported by thrust bearing 16 in tool holder 1, any translational motion of worm wheel 24 will be communicated to tool holder 1 and will cause a motion of tool holder 1 and slide 4 along tracks 12 and 13 of slide 5. A vernier dial 38 may be provided around the shaft of worm 23 adjacent knob 37 to provide an indication of the amount of motion obtained by turning the worm 23.

After the slide 4 has been moved to the desired position on tracks 12 and 13, bolts 14 and 15 should be tightened in position.

In order to obtain a motion of tool holder 1 which is in a radial direction with respect to the piece which is being machined, bolts 8 and 9 are first loosened to permit a translational movement of tool holder 1 with respect to slide 4. Also, worm wheel 24 is released for rotary motion by moving lugs 30 and 31 on arms 28 and 29 and block 34 out of engagement with worm wheel 24. Lugs 30 and 31 and block 34 are released from their clamping engagement with worm wheel 24 by actuating screw 32 by means of knob 35 as has been previously described. Lock nut 36 is turned so that it no longer abuts against the hub of worm wheel 24.

A rough adjustment in the radial direction may at first be obtained by turning handle 22 of threaded shaft 17. This advances threaded shaft 17 axially along the internal threads of worm wheel 24. Axial motion of threaded shaft 17 moves tool holder 1 since threaded shaft 17 is supported by thrust bearing 16 in the end of tool holder 1. Thus, motion of threaded shaft 17 is transmitted directly to tool holder 1 and produces an equivalent motion of that member.

After the rough radial adjustment of tool holder 1 has been obtained by manually rotating threaded shaft 17, as has just been described, nut 36 is tightened up against the left-hand edge of tool holder 1, with respect to the view shown in the drawing. By thus tightening nut 36 against the left-hand edge of tool holder 1, adjacent thrust bearing 16, threaded shaft 17 is prevented from rotating during the rotary motion of worm wheel 24 which produces the fine radial adjustment of tool holder 1, as will now be described.

In order to obtain a fine motion in the radial direction, worm 23 is rotated by means of knob 37, thereby causing a rotation of worm wheel 24 which is in mating relation with worm 23. Due to the internal threading of worm wheel 24, which is in engagement with the threads of threaded shaft 17, threaded shaft 17 is caused to move axially due to the rotation of worm wheel 24. This axial motion of threaded shaft 17, as has been explained, is communicated to tool holder 1 and provides the fine adjustment of motion which is necessary in order to position tool 3 at a definite radial position with respect to the work which is being machined. The amount of travel of tool holder 1 in the radial direction obtained wtih the rough initial adjustment may be read on scale 26 which is mounted on an edge of tool holder 1 parallel to the axis of threaded shaft 17. The vernier dial 38 may be used to determine the amount of fine adjustment of the motion of tool holder 1 in a radial direction obtained by turning worm 23.

In conclusion, it can be seen that we have provided a convenient, speedy, and easily operable means for adjusting both the axial and radial position of a tool holder for use with machine tools. We have provided a construction in accordance with which by turning a single adjusting device, namely, knob 37 of worm 23, a fine adjustment of motion of the tool holder may be obtained in either an axial or radial direction. A single vernier dial, namely dial 38, may be read to indicate the amount of motion obtained.

It should be noted that while we have designated the two directions of motion which may be obtained as axial and radial with respect to the object being machined, it is obvious that our adjustable tool holder provides for two motions relatively perpendicular to one another, and it is immaterial which of these is axial and which is radial.

While there has been shown and described a particular embodiment of our invention, it will be obvious to those skilled in the art that various changes and modifications can be made therein without departing from the invention and, therefore, it is aimed in the appended claims to cover all such changes and modifications as fall within the true spirit and scope of the invention.

What we claim as new and desire to secure by Letters Patent of the United States is:

1. A tool holding device movable in two mutually perpendicular directions in such manner that motion in either of said directions has no component of motion in the other of said directions, said device comprising a tool holding member, a thrust bearing supported by said tool holding member, a threaded shaft, one end of said threaded shaft being supported by said thrust bearing, a circular worm wheel rotatable about said threaded shaft, said worm wheel having internal threads along its axis and teeth along its exterior periphery, said internal threads of said worm wheel being in engagement with the threads of said threaded shaft, a rotatable worm having its axis positioned perpendicularly to the axis of said threaded shaft, the thread of said worm engaging said external teeth of said worm wheel in driving relation, and means independent of said worm for locking said worm wheel against rotation during motion of said device in one of said directions by rotation of said worm.

2. A tool holding device movable in two mutually perpendicular directions in such manner that motion in either of said directions has no component of motion in the other of said directions, said device comprising a tool holding member, a thrust bearing supported by said tool holding member, a threaded shaft, one end of said threaded shaft being supported by said thrust bearing, a circular worm wheel rotatable about said threaded shaft, said worm wheel having internal threads along its axis and teeth along its exterior periphery, said internal threads of said worm wheel being in engagement with the threads of said threaded shaft, a rotatable worm having its axis positioned perpendicularly to the axis of said threaded shaft, the thread of said worm engaging the external teeth of said worm wheel in driving relation, means for locking said worm wheel against rotation, rotation of said worm when said worm wheel is locked against rotation causing said worm wheel and said threaded shaft to advance axially of said worm, rotation of said worm when said worm wheel is unlocked for rotation causing said threaded shaft to advance axially of said worm wheel, linear motion of said threaded shaft being communicated to said tool holding member through said thrust bearing.

3. A tool holding device movable in two mutually perpendicular directions comprising a tool holding member, a thrust bearing supported by said tool holding member, a threaded shaft, one end of said threaded shaft being supported by said thrust bearing, a worm wheel, said worm wheel having internal threads along its axis and teeth along its exterior periphery, said internal threads of said worm wheel being in engagement with the threads of said threaded shaft, bearings for said worm wheel, a support for said bearings, said support having a track to permit motion of said bearings thereon, a worm positioned perpendicularly to said threaded shaft, the thread of said worm engaging the external teeth of said worm wheel, means for locking said worm wheel against rotation, rotation of said worm when said worm wheel is locked against rotation causing said worm wheel and said threaded shaft to advance axially of said worm, rotation of said worm when said worm wheel is unlocked for rotation causing said threaded shaft to advance axially of said worm wheel, motion of said threaded shaft being communicated to said tool holding member through said thrust bearing.

4. An adjustable tool holder assembly for use with a lathe comprising a base member, a slide member resting on said base member in slidable relation thereto, a tool support member resting on said slide member in slidable relation thereto, the direction of sliding motion between said slide member and said base member being perpendicular to the direction of sliding motion between said slide member and said tool support member, means for tightening said slide member to said base member and said tool support member to said slide member, a threaded shaft, said threaded shaft having its axis parallel to the direction of motion of said tool support member relative to said slide member, a thrust bearing for said threaded shaft, said thrust bearing being supported by said tool support member, a worm wheel having teeth along its external periphery, said worm wheel being internally threaded along its axis, the internal thread of said worm wheel being in engagement with said threaded shaft, a worm having its axis perpendicular to the axis of said threaded shaft, the thread of said worm being in mating relation with the external teeth of said worm wheel, means for locking said worm wheel against rotary motion, rotation of said worm when said worm wheel is locked against rotation causing motion of said worm wheel axially of said worm with corresponding motion of said threaded shaft axially of said worm, rotation of said worm when said worm wheel is unlocked for rotation causing motion of said threaded shaft axially of said worm wheel, motion of said threaded shaft being communicated to said tool support member through said thrust bearing.

5. An adjustable tool holder assembly for use with a lathe comprising a base member having grooved tracks, a slide member having projections engageable with said tracks, said base member and slide member being slidably movable relative to one another, a tool support member resting on said slide member in slidable relation thereto, the direction of sliding motion between said slide member and said base member being perpendicular to the direction of sliding motion between said slide member and said tool support member, means for tightening said slide member to said base member and said tool support member to said slide member, a threaded shaft, said threaded shaft having its axis parallel to the direction of motion of said tool support member relative to said slide member, a thrust bearing for said threaded shaft, said thrust bearing being supported by said tool support member, a worm wheel having teeth along its external periphery, said worm wheel also being internally threaded along its axis, the internal thread of said worm wheel being in engagement with said threaded shaft, a worm having its axis perpendicular to the axis of said threaded shaft, the thread of said worm being in mating relation with the external teeth of said worm wheel, means for locking said worm wheel against rotary motion, rotation of said worm when said worm wheel is locked against rotation causing motion of said worm wheel axially of said worm with corresponding motion of said threaded shaft axially of said worm, rotation of said worm when said worm wheel is unlocked for rotation causing motion of said threaded shaft axially of said worm wheel, motion of said threaded shaft being communicated to said tool support member through said thrust bearing.

References Cited in the file of this patent

UNITED STATES PATENTS

| Number | Name | Date |
|---|---|---|
| 116,517 | Wheeler et al. | June 27, 1871 |
| 1,036,256 | Junghans | Aug. 20, 1912 |
| 2,154,496 | Darash | Apr. 18, 1939 |
| 2,403,581 | Casella | July 9, 1946 |
| 2,489,183 | Inge | Nov. 22, 1949 |
| 2,608,879 | Megel | Sept. 2, 1952 |